United States Patent [19]
Kondo et al.

[11] Patent Number: 6,151,652
[45] Date of Patent: Nov. 21, 2000

[54] I/O CARD, ELECTRONIC EQUIPMENT USING I/O CARD, AND PROCEDURE OF STARTING UP SUCH ELECTRONIC EQUIPMENT

[75] Inventors: Kenichi Kondo; Takeshi Ogawa, both of Kawasaki; Keihiro Kurakata, Kiyose, all of Japan

[73] Assignee: Canon Kabushiki Kaisha, Tokyo, Japan

[21] Appl. No.: 09/100,401

[22] Filed: Jun. 19, 1998

[30] Foreign Application Priority Data

Jun. 27, 1997 [JP] Japan ................................. 9-172109
Dec. 18, 1997 [JP] Japan ................................. 9-349253

[51] Int. Cl.[7] .............................. G06F 1/18; G06F 3/00; G06F 13/14; G11B 19/00; G11B 19/02
[52] U.S. Cl. ............................ 710/129; 710/62; 710/73; 710/102; 710/101; 710/64; 710/18; 235/380; 307/66; 307/131; 348/232
[58] Field of Search ...................... 348/232, 231; 307/131, 66; 710/73, 102, 101, 129, 64, 18; 713/320, 340; 361/683; 363/49; 235/380

[56] References Cited

U.S. PATENT DOCUMENTS

| | | | |
|---|---|---|---|
| 4,827,111 | 5/1989 | Kondo ..................................... | 235/380 |
| 5,375,051 | 12/1994 | Decker et al. ............................. | 363/49 |
| 5,561,772 | 10/1996 | Dornier et al. ........................... | 395/281 |
| 5,589,719 | 12/1996 | Fiset ........................................ | 307/131 |
| 5,606,704 | 2/1997 | Pierce et al. ............................. | 395/750 |
| 5,664,231 | 9/1997 | Postman et al. .......................... | 395/893 |
| 5,671,374 | 9/1997 | Postman et al. .......................... | 395/309 |
| 5,727,168 | 3/1998 | Inoue et al. .............................. | 395/282 |
| 5,754,227 | 5/1998 | Fukuoka .................................. | 348/232 |
| 5,797,024 | 8/1998 | Gochi ................................. | 395/750.08 |
| 5,799,196 | 8/1998 | Flannery ............................ | 395/750.03 |
| 5,815,201 | 9/1998 | Hashimoto et al. .................... | 348/232 |
| 5,815,205 | 9/1998 | Hashimoto et al. .................... | 348/373 |
| 5,870,615 | 2/1999 | Bar-On et al. ..................... | 395/750.02 |
| 5,890,016 | 3/1999 | Tso ......................................... | 395/884 |
| 5,892,975 | 4/1999 | Barnes .................................... | 395/838 |
| 5,909,586 | 6/1999 | Anderson ........................... | 395/750.08 |
| 5,917,545 | 6/1999 | Kowno et al. .......................... | 348/231 |
| 6,060,789 | 5/2000 | Yamaguchi .............................. | 307/66 |

FOREIGN PATENT DOCUMENTS

| | | |
|---|---|---|
| 08095687 | 4/1996 | Japan . |
| 08167227 | 6/1996 | Japan . |
| 08167228 | 6/1996 | Japan . |

*Primary Examiner*—Thomas C. Lee
*Assistant Examiner*—Katharina Schuster
*Attorney, Agent, or Firm*—Fitzpatrick, Cella, Harper & Scinto

[57] ABSTRACT

A system includes a computer and digital camera connected to each other; automatic image transfer or remote control can be achieved readily, and a power supply route is simple. A card connector for an I/O card and a back connector thereof are linked by a power supply line. When the I/O card is connected to a digital camera, power supplied over an interface cable joined with the back connector is supplied to the digital camera. Moreover, when the I/O card is connected to the digital camera, a start-up instruction signal is sent from the I/O card to the digital camera. A CPU in the digital camera executes start-up processing.

27 Claims, 14 Drawing Sheets

I/O CARD, ELECTRONIC EQUIPMENT USING I/O CARD, AND PROCEDURE OF STARTING UP SUCH ELECTRONIC EQUIPMENT

BACKGROUND OF THE INVENTION

1. Field of the Invention

The present invention relates to an I/O card, electronic equipment using the I/O card, and a procedure for starting up the electronic equipment.

2. Description of the Related Art

In recent years, lots of digital still cameras have been commercialized as one type of peripheral equipment for use with computers. As for a procedure for taking image data produced by a digital still camera into a computer, each of the procedures described below has been adopted.

1. A digital still camera has a slot accommodating a PC card. A memory card is mounted in the slot in order to save data therein. The demounted memory card is then mounted in a computer in order to load the data from the card into the computer. In this procedure, mounting or demounting the card is achieved manually. As for the card slot, a card slot conformable to the PCMCIA standard is often adopted.

2. A camera and computer are interconnected using an interface cable, whereby data is transferred directly. In this case, an interface connector formed in the camera must be compact. An interface connector compatible with the RS-232C standard is therefore often employed.

3. A camera is connected to a conversion adaptor via a dedicated interface. For connecting the conversion adaptor to a computer, an interface of a standard rating such as a parallel interface is employed.

On the other hand, as the PC card, not only a memory card but also an I/O card has come to be commercialized recently. For data transfer from a digital still camera to a computer, a procedure of connecting the digital camera to the computer via such an I/O card is conceivable as a fourth procedure.

The foregoing procedures are concerned with data transfer. For operating a camera at a computer, second and third connections are needed.

However, transferring image data to a computer or operating a camera at a computer according to any of the three foregoing procedures of the prior art has problems, described below.

According to the first procedure, data transfer is carried out manually. Every time a memory card is filled with data, the card must be mounted and demounted. When photography is carried out intermittently with a camera set up, the camera must be moved at every mounting and demounting. This means that the position of the image is shifted often.

Moreover, an intermittent photography time is restricted by the storage capacity of a memory. The first procedure can therefore be said to be effective for random photography that is usually carried out using a silver-film camera.

A digital still camera that can be controlled remotely when connected to a computer and can transfer data directly to or from the computer is promising as peripheral equipment for computers. However, when the camera is connected to the computer according to any of the second to fourth procedures, problems described below occur.

To begin with, according to the second procedure, a camera uses its own battery as a power source. The operating time of the camera therefore depends on the longevity of the battery. The power supply of the camera must therefore be manually turned on or off from time to time in order to prevent the battery from being used up prematurely. For reducing consumption of the battery power, some cameras have a facility for turning off the power supply when no action instruction is issued to the camera for a specified time. However, when such a camera is connected directly to a computer, this facility merely increases the bother to the user, and to avoid this, the camera can only be placed immediately close to the computer and the user. The concept of remote control thus cannot be fully embodied.

The fourth procedure has the same problem as the second procedure.

It is the third procedure that alleviates the above problem. An interface conversion adaptor to be employed is therefore requested to receive power from an AC power supply. The employment of the interface conversion adaptor enables power supply to a camera. A signal line over which a start-up instruction is transmitted is included as one of several transmission lines linking the conversion adaptor and camera, whereby power management to be executed at a computer can be achieved.

However, this procedure requires incorporation of an AC-to-DC conversion circuit or provision of a separate AC-to-DC conversion adaptor. This poses a problem that either the interface conversion adaptor becomes large in size, or the number of entities connected to the adaptor increases. Moreover, a plurality of cables are needed to connect the entities. For this reason, a set of equipment for converting one interfacing specification into another becomes expensive. Moreover, connections among the camera, adaptor, and computer become complex.

Moreover, the digital still camera must cope with the necessity of being connected to a computer as well as the necessity of recording multiple images. For coping with these necessities, the storage capacity of a built-in memory of the camera is insufficient. An external memory such as a memory card is therefore employed. For this reason, the camera is provided with both an interface terminal and memory card slot. This leads to a large size of the camera and a large circuit scale. Consequently, the cost of the camera increases.

SUMMARY OF THE INVENTION

For solving the aforesaid problems, an I/O card in accordance with the present invention comprises a circuit for supplying power received via a first connecting means to electronic equipment linked to a second connecting means.

Another aspect of an I/O card in accordance with the present invention comprises a plurality of connecting means, and a power receiving means for receiving power supplied via at least two connecting means out of the plurality of connecting means.

Another version of an I/O card in accordance with the present invention comprises a first connector used to connect first electronic equipment, a second connector used to connect an interface cable, and a third connector.

Moreover, a piece of electronic equipment in accordance with the present invention comprises a connecting means used to connect an I/O card, and a power receiving means for receiving power supplied via the connecting means. A power supply line is included in the connecting means.

Another version of electronic equipment in accordance with the present invention comprises a connecting means used to connect an I/O card, a receiving means for receiving a start-up request signal output from the I/O card linked to the connecting means, and a processing unit for carrying out start-up processing in response to the start-up request signal. In this version, a signal line is included in the connecting means.

Still another version of electronic equipment in accordance with the present invention comprises a connecting means used to connect an I/O card, a first power receiving means for receiving power supplied over a power supply line included in the connecting means, a second power receiving means for receiving power supplied externally, and a selecting means for selecting one of the first power receiving means and second power receiving means.

An electronic system in accordance with the present invention comprises an I/O card including a circuit for supplying power received via a connecting means to electronic equipment linked to another connecting means, and electronic equipment including a connecting means used to connect the I/O card, and a power receiving means for receiving power supplied via the connecting means, and having a power supply line included in the connecting means.

Moreover, in a procedure of starting up electronic equipment in accordance with the present invention, a start-up instruction signal to be supplied with linkage of an I/O card to a connecting means is received, and start-up processing is executed for an electronic equipment upon reception of the instruction signal. Other objects, features and advantages of the present invention will be more fully appreciated from the following detailed description of the preferred embodiments, taken in conjunction with the accompanying drawings.

DESCRIPTION OF THE PREFERRED EMBODIMENTS

The preferred embodiments of the present invention will be described, in conjunction with the drawings.
(First Embodiment)

Figure 1:
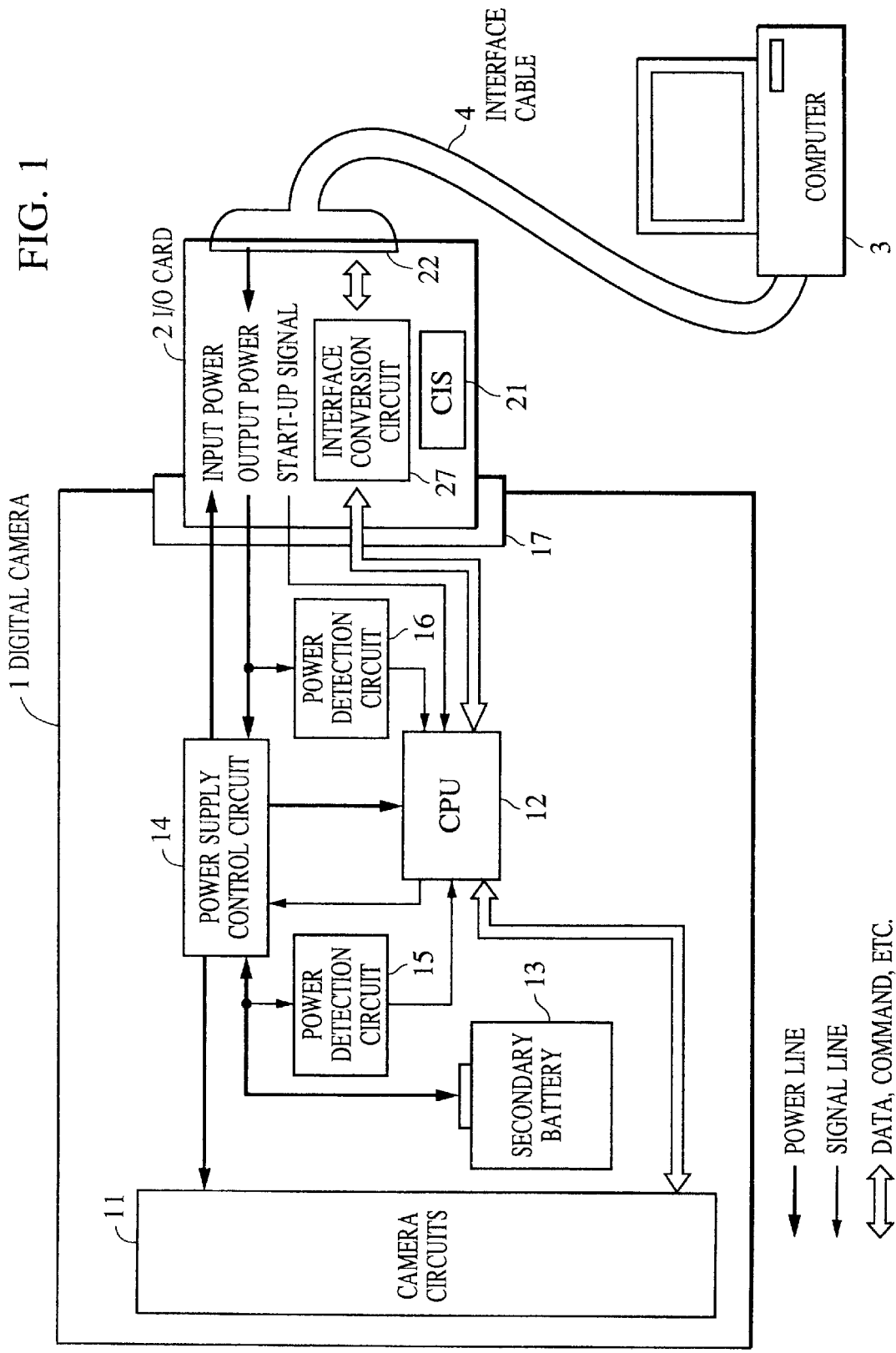
FIG. 1 is a functional block diagram of the first embodiment of the present invention.

FIG. 1 is a functional block diagram of a digital camera system in which the present invention is implemented.

In FIG. 1, there is shown a digital camera 1 comprising a power supply unit and other camera circuits. Reference numeral 11 denotes the camera circuits other than the power supply unit. The camera circuits 11 include an imaging circuit, and a camera control circuit. The power supply unit consists of a CPU 12, a secondary battery 13, a power supply control circuit 14, and power detection circuits 15 and 16.

The CPU 12 controls all the camera circuits including the power supply unit. However, the camera circuits 11 except the power supply unit and the power supply unit may each be provided with a dedicated CPU. Reference numeral 13 denotes a chargeable secondary battery. The power supply control circuit 14 controls a route within a camera, along which power is supplied, under the control of the CPU 12. The power detection circuit 15 detects the voltage on a power supply line supplied from the secondary battery 13.

There is shown a card connector 17 that is a connector configured in conformity with a standard rating such as the PCMCIA standard and works as a contact with a memory card, I/O card, or the like (hereinafter, I/O card). The power detection circuit 16 detects the voltage on the power supply line supplied via the card connector 17.

There is shown an I/O card 2. Reference numeral 21 denotes card attribute information (CIS) to be stored in the I/O card 2, that is, information concerning the facilities of each card, and reference numeral 22 denotes a back connector with which an interface cable used to connect the I/O card to a computer 3 is joined.

There is shown the computer 3. Reference numeral 4 denotes an interface cable that includes a power supply line conformable to the USB or IEEE 1394 standard.

There is shown an interface conversion circuit 27 for converting a data signal, command signal, or the like so as to convert an interfacing form adapted to the card connector 17 into an interfacing form adapted to the back connector 22 or the interfacing form adapted to the back connector 22 to the interfacing form adapted to the card connector 17.

Figure 14:
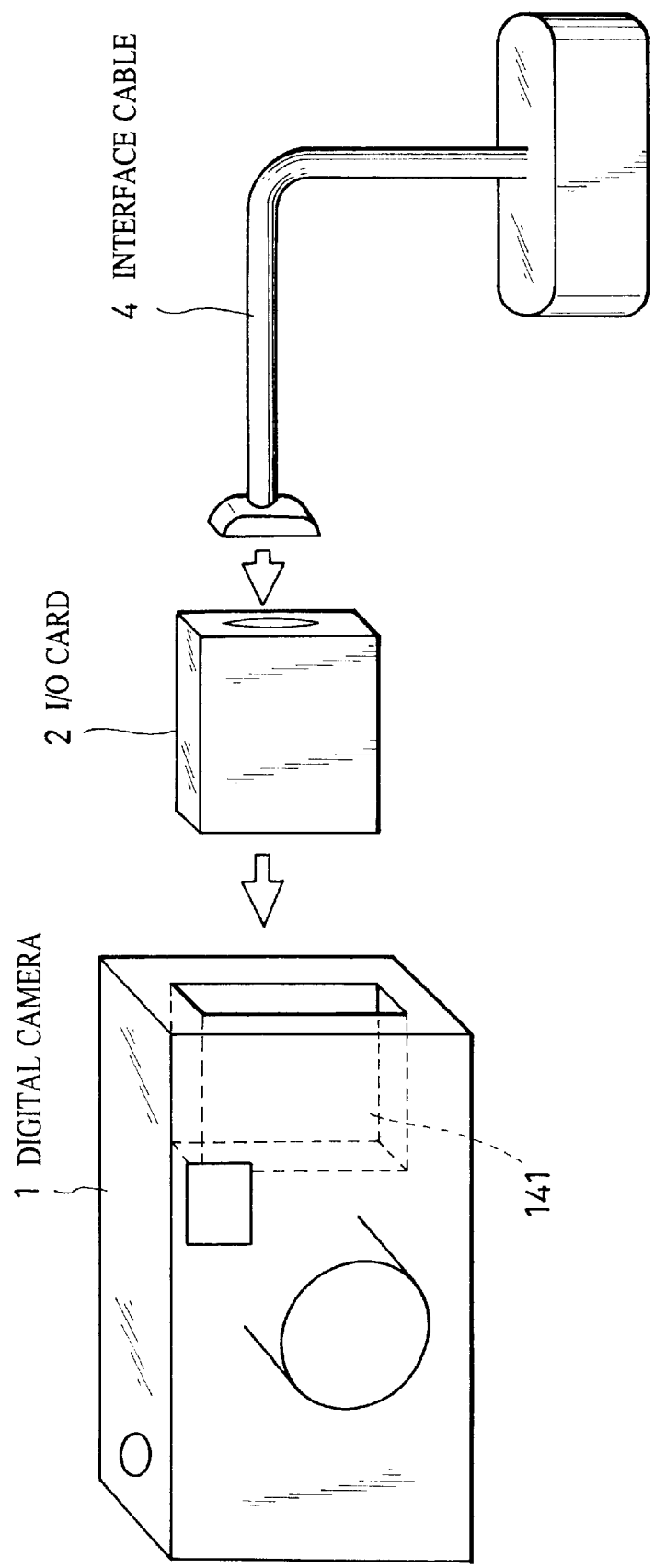
FIG. 14 is an oblique view showing the relationship of connections among units constituting a system.

FIG. 14 is a connection diagram showing connections of units constituting the system. In FIG. 14, the I/O card 2 is inserted into a card slot formed in a side surface of the digital camera 1. The interface cable 4 is joined with the back connector 22 of the I/O card 2. Dotted line 141 in the drawing indicates the interior shape of the card slot.

Operations performed by the digital camera system shown in FIG. 1 will be described below.

The I/O card 2 in this system has a terminal through which power is output and a signal terminal through which a start-up instruction is given.

A start-up signal is an interrupt signal (wake-up signal) used to awaken the electronic still camera (digital camera) from a sleep state, in which almost all the facilities of the camera are halted for the purpose of power saving, to a wake-up state (active state). When the digital camera 1 stays in the sleep state, although power is supplied to the CPU 12, the camera is cleared or is placed in an equivalent state.

In this state, when the start-up signal makes a transition (for example, a low-to-high transition), the CPU 12 wakes up (becomes active), and awakens individual units (for example, an imaging circuit system, a memory circuit system, and a display system including an electronic viewfinder) of the digital camera 1 (supplies power to the units, and establishes a state enabling camera operations such as transmission of an action standby instruction or action start instruction to the units, and transfer of setting data representing the conditions for photography). In this embodiment, making a transition from the sleep state of a piece of equipment to the active state is referred to as start-up. The interrupt signal to be sent to the CPU 12 for this purpose is referred to as a start-up (wake-up) signal.

The I/O card 2 is connected to the digital camera 1 having the card connector 17. Power to the I/O card 2 is supplied from the digital camera 1 through the terminal formed to supply power to the card.

By the way, the I/O card 2 and card connector 17 each have a terminal through which power is supplied to the digital camera 1 via the I/O card 2. When the I/O card 2 is connected to the computer 3 with the interface cable 4 including the power supply line joined to the back connector 22, power can be supplied from the computer 3 to the interface cable 4, from the interface cable 4 to the I/O card 2, and then from the I/O card 2 to the digital camera 1.

Figure 10:
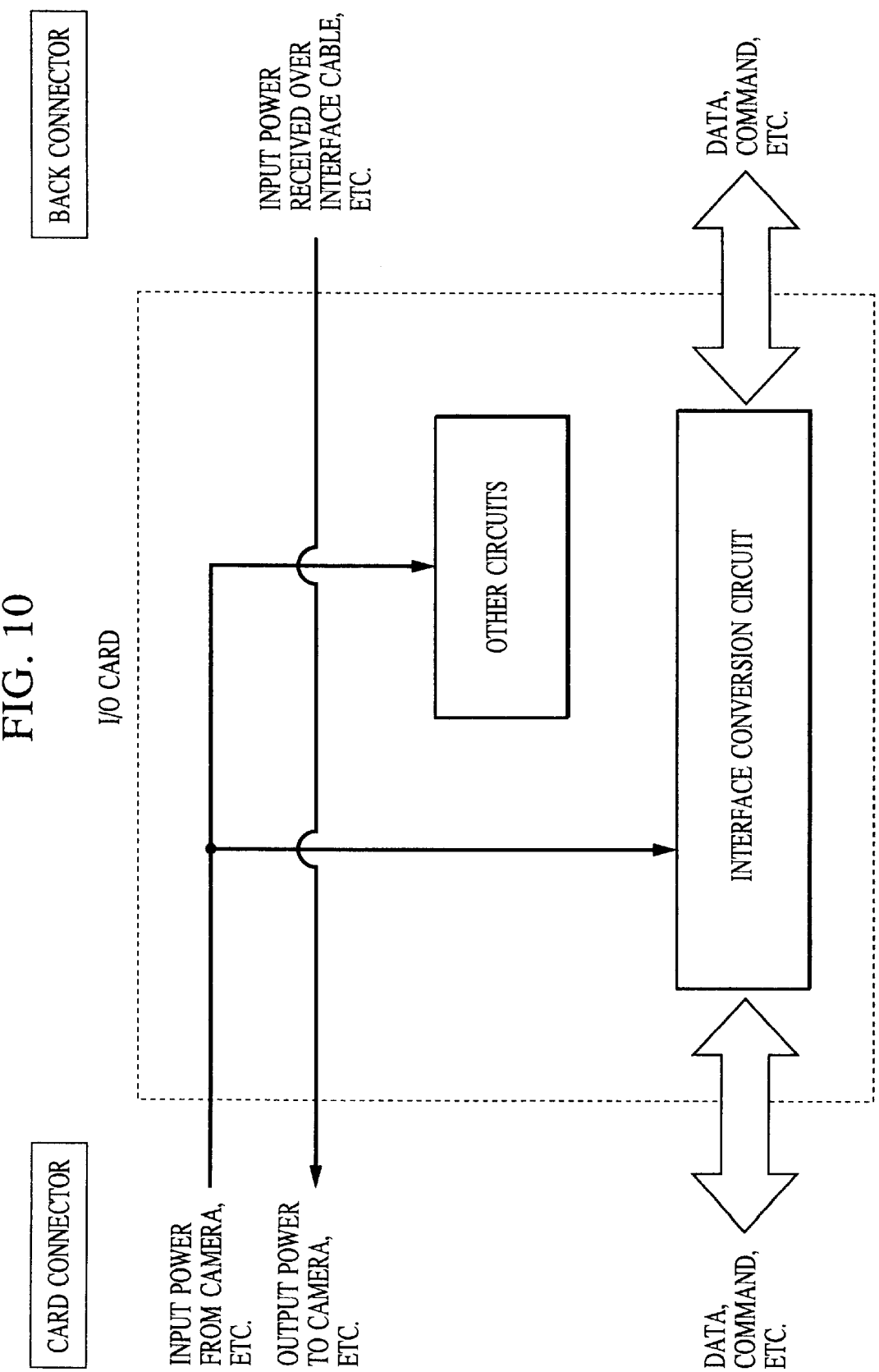
FIG. 10 is a functional block diagram of an I/O card.

FIG. 10 is a functional block diagram showing the interior of the I/O card 2. In FIG. 10, the power line extending from the back connector 22 is joined to the power supply terminal of the card connector 17 as it is. Power to the circuits within the I/O card 2 is supplied from the digital camera 1 through the power supply terminal of the card connector 17.

The card may be configured in such a way that part of the circuits within the I/O card 2 receive power via the back connector 22, but the other circuits receive power via the card connector 17. Moreover, circuitry in which power is supplied to part of the circuits within the I/O card 2 via either the back connector 22 or card connector 17 will do.

Figure 11:
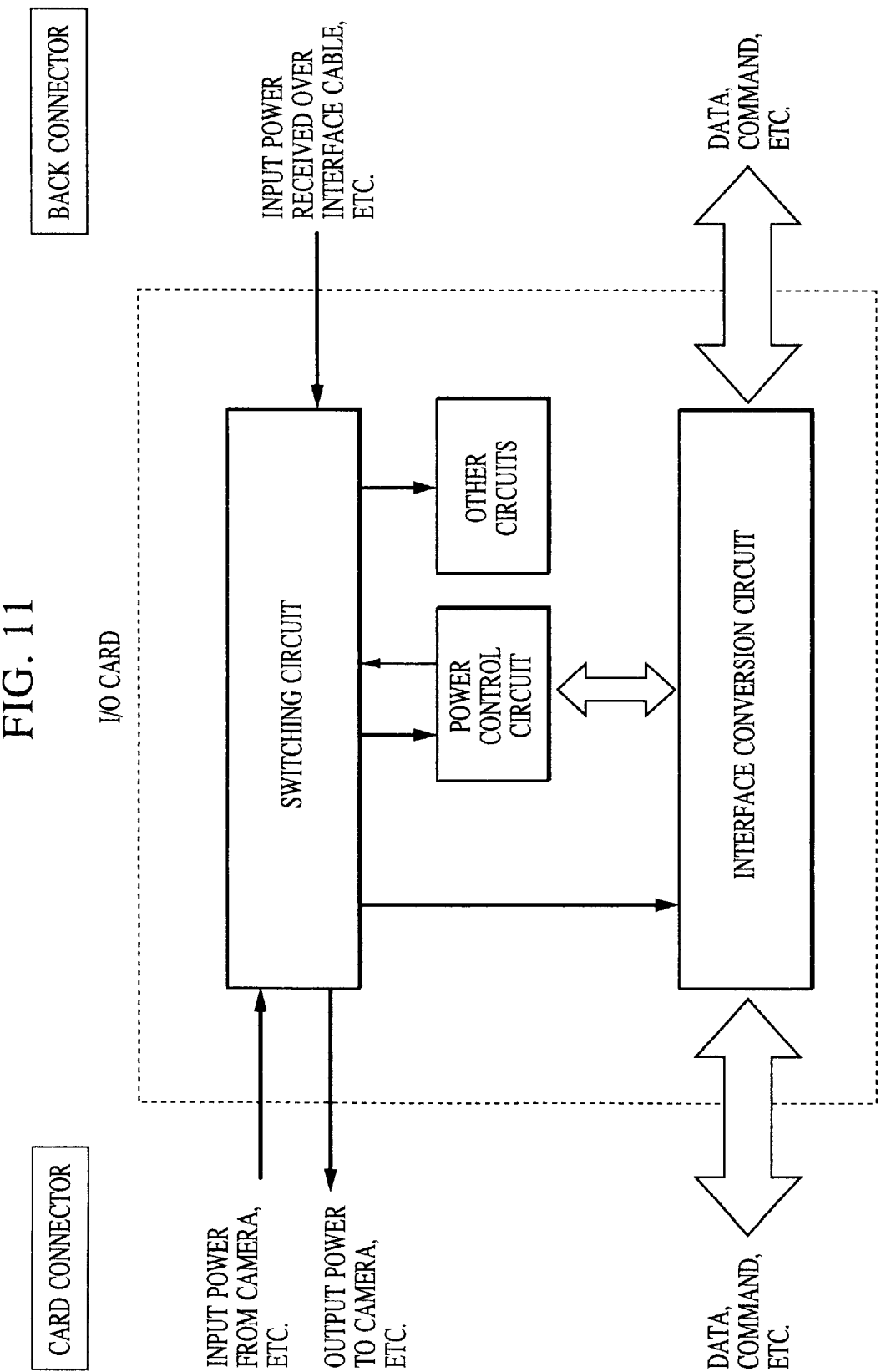
FIG. 11 is a functional block diagram of an I/O card.

Furthermore, the card may be configured so that whether the I/O card 2 itself receives power via the back connector 22 or via the card connector 17 can be selected. FIG. 11 is a block diagram of this card facility. When the card is thus configured, the card can select either of the power sources without involving the camera. Instructing selection of power is achieved in response to an instruction sent from the computer 3 or from the CPU 12 in the camera 1, or is made by a judgment circuit (not shown) in the I/O card 2. In this kind of I/O card, when the condition for a voltage is different between the card connector-routed power and back connector-routed power, a constant-power circuit is also provided in the card.

The digital camera 1 is operated with power supplied from the secondary battery 13 mounted therein, or with power supplied via the I/O card 2 (hereinafter, the former is referred to as a self-drive mode and the latter is referred to as a card-drive mode). Moreover, charging the secondary battery 13 is achieved with power supplied via the I/O card 2 (hereinafter, this is referred to as a card-charge mode).

The plurality of power modes are controlled by the power supply control circuit 14.

Figure 8:
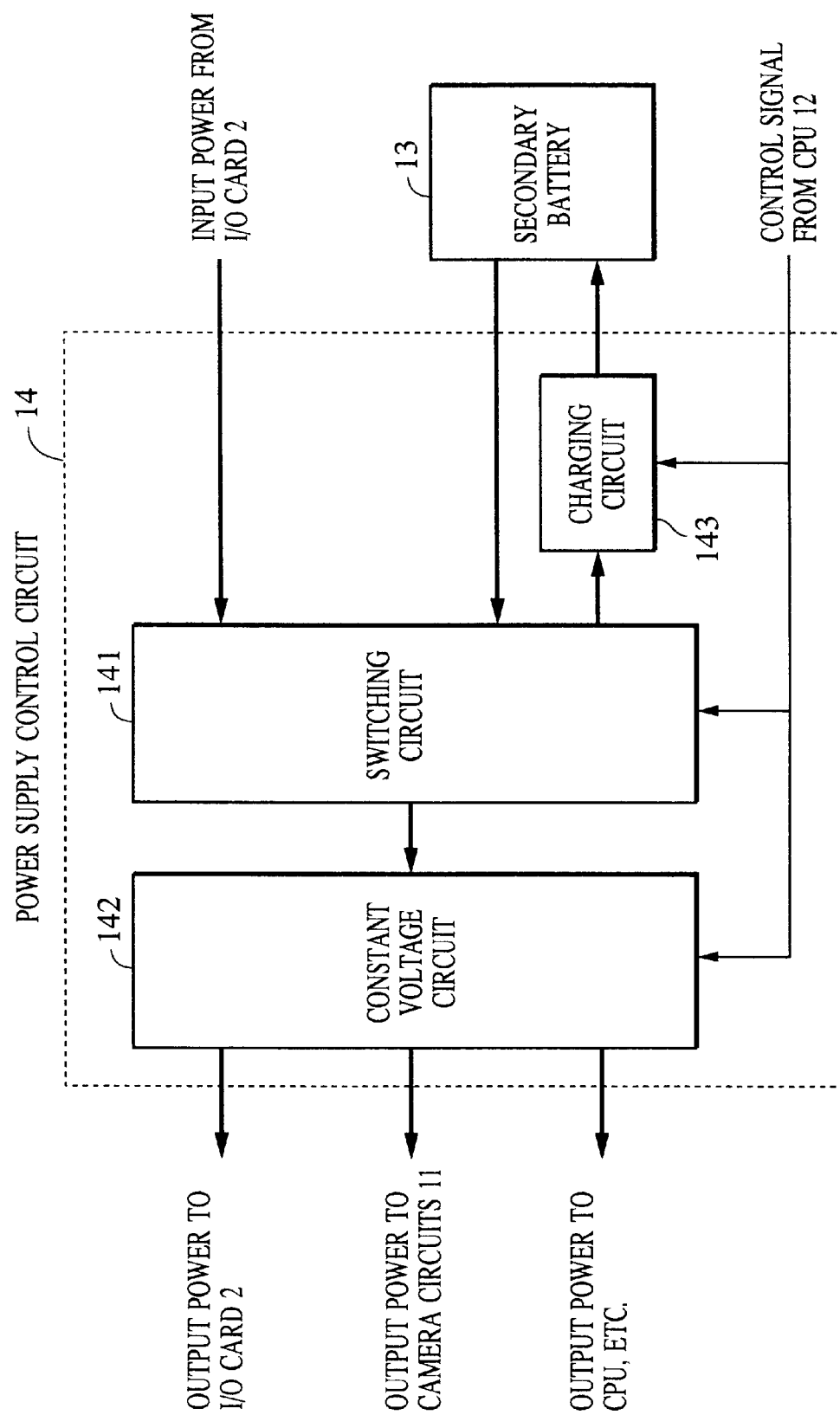
FIG. 8 is a diagram showing the block configuration of a power supply control circuit 14.

FIG. 8 shows the block configuration of the power supply control circuit 14.

In FIG. 8, there is shown a switching circuit 141 for selecting either power supplied via the I/O card 2 or power supplied from the secondary battery 13, and designating charging of the secondary battery 13. Reference numeral 142 denotes a constant voltage circuit for converting power selected by the switching circuit 141 (power supplied from the secondary battery 13 or power supplied via the I/O card 2) into a given voltage, and applies the voltage as power to the camera circuits 11 (including the CPU and power supply unit) and I/O card 2.

A PC card linked to the card connector of a camera does not always have a power supply facility. The fundamental form of power supply is therefore power supply from the camera to the card. In the case of the camera in accordance with the present invention, either power supplied from a power supply (a mounted battery or AC adapter) such as has been included in cameras in the past or power supplied via an I/O card is selected through power control. The selected power is then supplied through a power reception terminal of the I/O card.

The selection is carried out on the basis of a judgment made from attribute information (CIS) stored in the card, a power condition instruction sent from the computer, or the result of a power sensing process in the camera. If a memory card to be inserted into a card slot alone, or an I/O card to be linked to an interface cable having no power line or having a power line whose capacity for supplying power is limited is inserted, power is supplied to the card only from the camera.

The I/O card 2 has a power reception terminal on the side of the interface cable, and has a power reception terminal and power supply terminal on the side of the card connector. The card connector of the camera has a power reception terminal and power supply terminal. Consequently, both a PC card having a power supply ability and a PC card having no power supply ability become usable.

There is shown a charging circuit 143 for charging the secondary battery 13. When the ability of the I/O card 2 to supply power to the camera is sufficient, the power supply control circuit causes the charging circuit to charge the secondary battery 13 using power supplied via the I/O card 2. Judgment of the power supply ability is made from CIS stored in the I/O card 2 or power information or the like concerning the interface cable sent from the computer.

Since the I/O card 2 is thus provided with the power supply terminal, when the I/O card 2 is inserted into the card connector 17 of the digital camera 1 and connected to the computer 3 over the interface cable 4, data transfer from the digital camera 1 to the computer 3 and remote control of the digital camera 1 become possible. Moreover, it can be avoided that the battery in the digital camera 1 is consumed. In addition, it is possible to charge the battery.

Moreover, when the power supply control circuit is included in the digital camera or I/O card, power supplied over the interface cable 4, power supplied from the secondary battery in the camera, or power supplied via an AC adaptor is selected as operating power. Thus, power control can be accomplished. This makes it possible not only to prevent the battery in the digital camera from being consumed but also to charge the battery when the digital camera is connected to the computer.

Furthermore, when the computer is battery-driven, systematic power management to be achieved by ceasing charging of the camera or operating the camera itself in the self-drive mode becomes possible. In this case, information indicating that the computer is battery-driven is transmitted from the computer. Moreover, at the same time, the camera transmits information of its own power state to the card and the computer (whether the camera is self-driven or card-driven). If the camera is self-driven, the transmitted information also indicates whether the camera is battery-driven or driven by an AC adaptor. If the camera is battery-driven, the kind of battery used is conveyed) to the card and computer. Thus, power within the system is managed.

Furthermore, a signal (start-up signal) used to activate the digital camera is output from the I/O card 2. This makes it possible to remotely control activation of the digital camera 1. Moreover, automatic transfer of data to the personal computer 3 becomes possible.

Next, operations performed by the system will be described.

Figure 9:
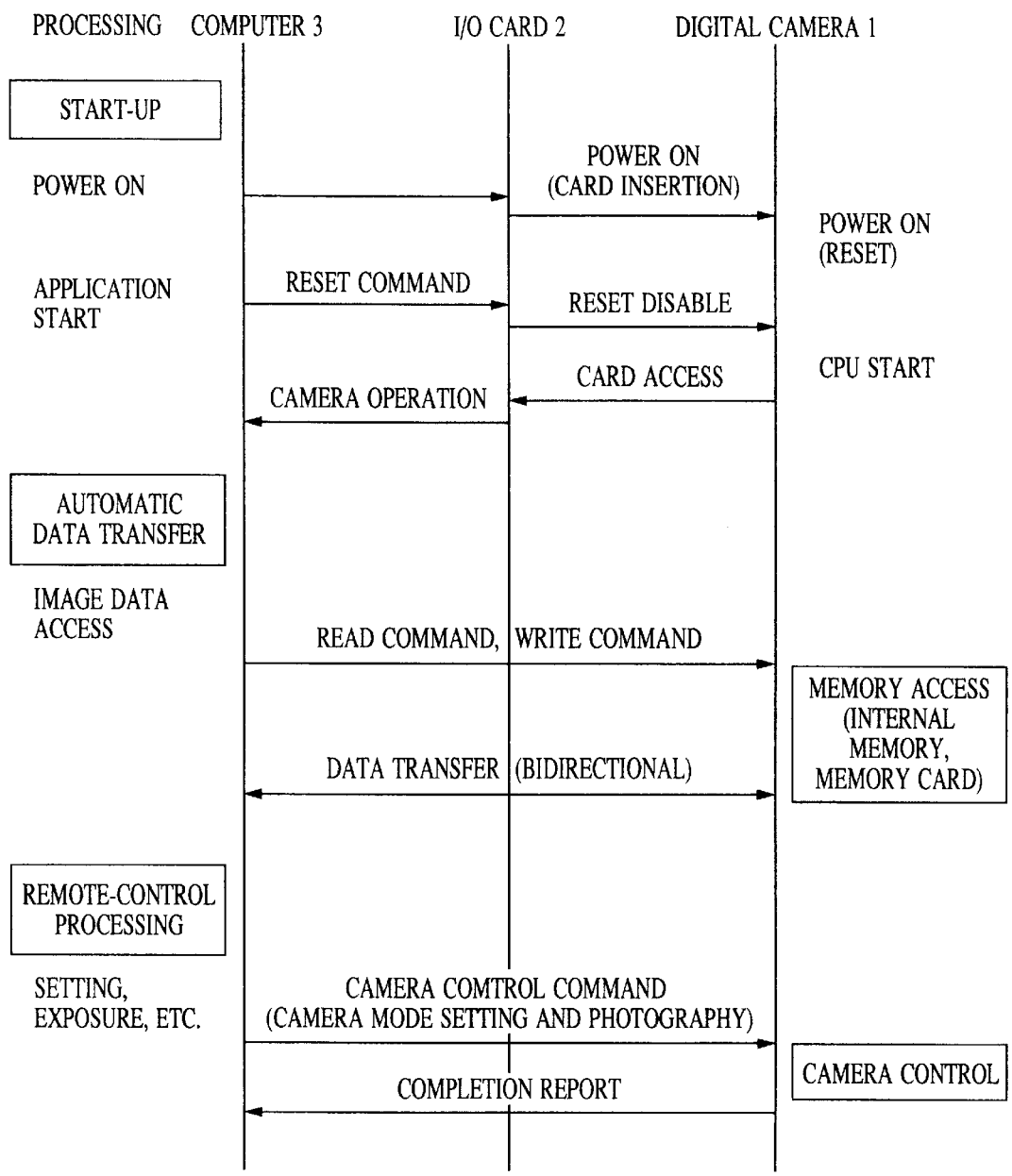
FIG. 9 is a diagram showing the stream of operations performed in the embodiment.

FIG. 9 is a diagram showing the stream of operations performed in this embodiment.

When the power supply of the computer 3 is turned on with the computer 3, interface cable 4, I/O card 2, and digital camera 1 interconnected, the computer 3 starts up. Power is then supplied to the digital camera 1 through the power supply terminal of the card connector 17 after passing through the I/O card 2 over the interface cable 4.

Power is also supplied to the I/O card 2 through the power input pin of the card connector 17.

Thereafter, the computer 3 confirms that the I/O card 2 is connected, and then sends a reset command to the I/O card 2. In response to the reset command, the I/O card 2 outputs a start-up signal (a signal that merely makes a low-to-high transition) to the CPU 12 in the digital camera 1 through the start-up signal terminal. This-activates the CPU 12 in the digital camera 1.

The foregoing operations are triggered by turning on the power supply of the computer 3. Alternatively, when the I/O card 2 is inserted into the digital camera 1 with the computer 3, interface cable 4, and I/O card 2 interconnected, start-up processing may be carried out. Moreover, when the computer 3, interface cable 4, I/O card 2, and digital camera 1 have already been interconnected, if a user wants to activate the digital camera 1, the user may instruct start-up of the digital camera 1 at the computer 3.

When the computer 3, interface cable 4, and I/O card 2 are interconnected, if the I/O card 2 is inserted into the digital camera 1, a whole-system start-up sequence to be triggered with insertion of a card may be such that the start-up signal terminal or any other mechanical sensing means is used to detect the insertion of the I/O card 2, the digital camera 1 starts up, power is supplied from the digital camera 1 to the I/O card 2, and then the computer 3 is started up via the I/O card 2.

As a subsequent operation to be carried out in response to an instruction sent from the computer or to be preceded by the start-up, image data in an internal memory (not shown) of the digital camera 1 may be transferred automatically. When the digital camera 1, I/O card 2, and computer 3 are activated as mentioned above, the internal memory of the digital camera 1 or an external memory such as a memory card may be searched to see if image data is present. If image data is present, the image data may be transferred to the computer 3 and displayed on the display of the computer 3. Moreover, the system may be configured in such a way that when the amount of information stored in the memory becomes equal to or larger than a certain amount, image data is transferred automatically to the computer 3.

For transferring data or activating image display software at the same time when the computer 3 is started up, the computer autonomously activates application software by reading the CIS of an I/O card or attribute information of a digital camera at the time of start-up of the I/O card or digital camera. When the computer thus reads the attribute information of the camera, the CPU in the camera reads attribute information of the card and computer at the same time. Thereafter, the computer and camera mutually transfer information such as operating states thereof from time to time.

The power detection circuit 16 that plays an important role in the foregoing start-up or subsequent automatic data transfer. After power is supplied via the card connector 17, when the CPU 12 starts up in response to a start-up signal, a current of a specified magnitude flows into the power supply. Fluctuation in the supply voltage is checked to see if the power is usable. If the fluctuation in supply voltage is too great, the power supply control circuit 14 is controlled so that the camera can be driven by the internal battery. A warning is then given using the display system of the computer 3 or digital camera 1. If the power supply system has no such problems, a subsequent operation such as automatic data transfer or remote control at the computer proceeds.

Incidentally, a specified current used to sense power is supplied instantaneously in order only to sense power at the time of start-up. Thereafter, a voltage is sensed by performing a normal operation. If an abnormality is detected, a warning is given using the display system of the computer or digital camera.

What is referred to as an abnormality includes, for example: the interface cable being disconnected; when the computer is driven by its own built-in battery, the ability of the computer to supply power deteriorating because of consumption of the battery; or the card or computer breaking down. In this case, when the camera is set to the card-drive mode, the power supply control circuit system is controlled in order to change the camera to the self-drive mode. The camera uses its own display system to display a warning saying that an abnormality has occurred and the fact that drive modes are changed, and transmits change information concerning an operating state to the computer.

Remote control extended at the computer 3 is also enabled by the foregoing construction. Moreover, when the digital camera 1 does not need to operate, the whole camera may be halted, and later started up if necessary. At this time, the secondary battery 13 may be charged. Thus, power management can be achieved readily.

Talking of an operation performed by the power control circuit 14, when no power is supplied via the I/O card 2, or although power is supplied via the I/O card 2, if the power is judged not to be proper (through power sensing performed by the power detection circuit 16), the switching circuit in the power supply control circuit 14 operates so that power supplied from the secondary battery 13 can be input to a low-voltage circuit and supplied to individual units by way of the constant voltage (constant power) circuit. If power supplied via the I/O card 2 is sufficient, the switching circuit turns off power supply from the secondary battery, inputs power received via the I/O card 2 to the constant-voltage circuit, and supplies the power to the individual units by way of the constant-voltage circuit. At this time, the setting of the switching circuit is selected so that the secondary battery 13 can be charged by the charging circuit. Even when the circuit system in the digital camera 1 is brought to the sleep state, charging with power supplied via the card is continued.

(Second Embodiment)

If data transfer to or from the I/O card 2 is possible, data transfer to or from the internal memory of the digital camera 1 as well as a memory card should be possible. For this purpose, two card slots used for the I/O card and memory card must be formed in a camera. This results in a large size of the camera. Moreover, since the CPU of the camera acts as a go-between between the memory card and I/O card, signal transmission becomes complex.

It is the second embodiment that solves this problem.

Figure 2:
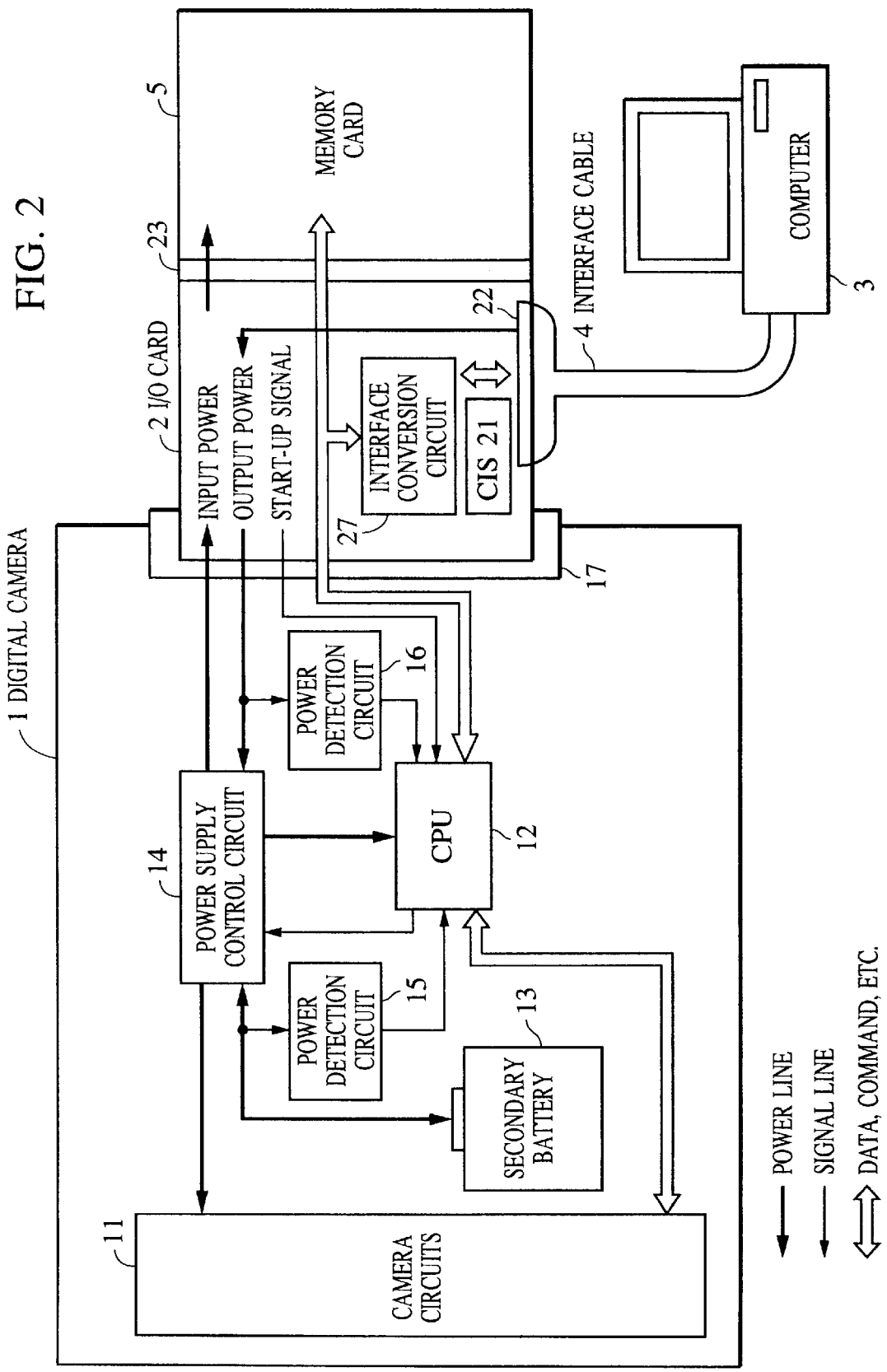
FIG. 2 is a functional block diagram of the second embodiment of the present invention.

FIG. 2 is a functional block diagram of a digital camera system of the second embodiment, wherein the same reference numerals are assigned to components identical to those shown in FIG. 1.

In FIG. 2, the I/O card 2 has a connector 23 for interfacing a card in addition to the back connector 22 to be joined with the interface cable 4. owing to the inclusion of the connector 23, the I/O card 2 and memory card 5 can be connected in series with each other.

Moreover, although the digital camera 1 has only one card slot, the I/O card 2 and memory card 5 can be operated simultaneously.

Moreover, since the memory card can be accessed without the involvement of the CPU of the camera, power-saving operation can be achieved.

In FIG. 2, the I/O card 2 is inserted into the camera, and the memory card 5 is connected to the I/O card. Alternatively, the I/O card and memory card may be arranged inversely. In such a case, power supplied over the power supply line in the I/O card 2 and a start-up signal are transmitted to the camera via the memory card 5.

Figure 12:
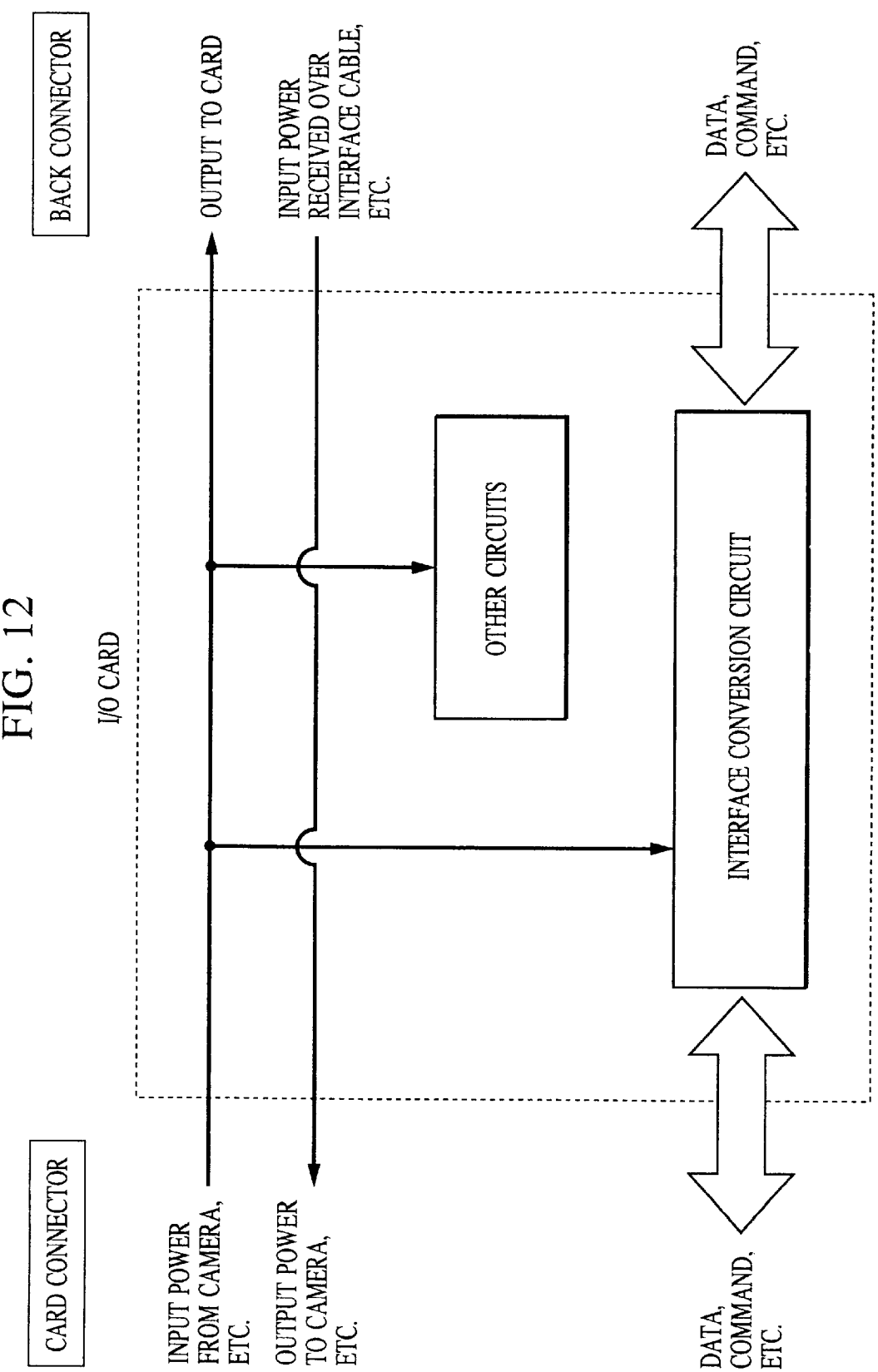
FIG. 12 is a functional block diagram of an I/O card.
Figure 13:
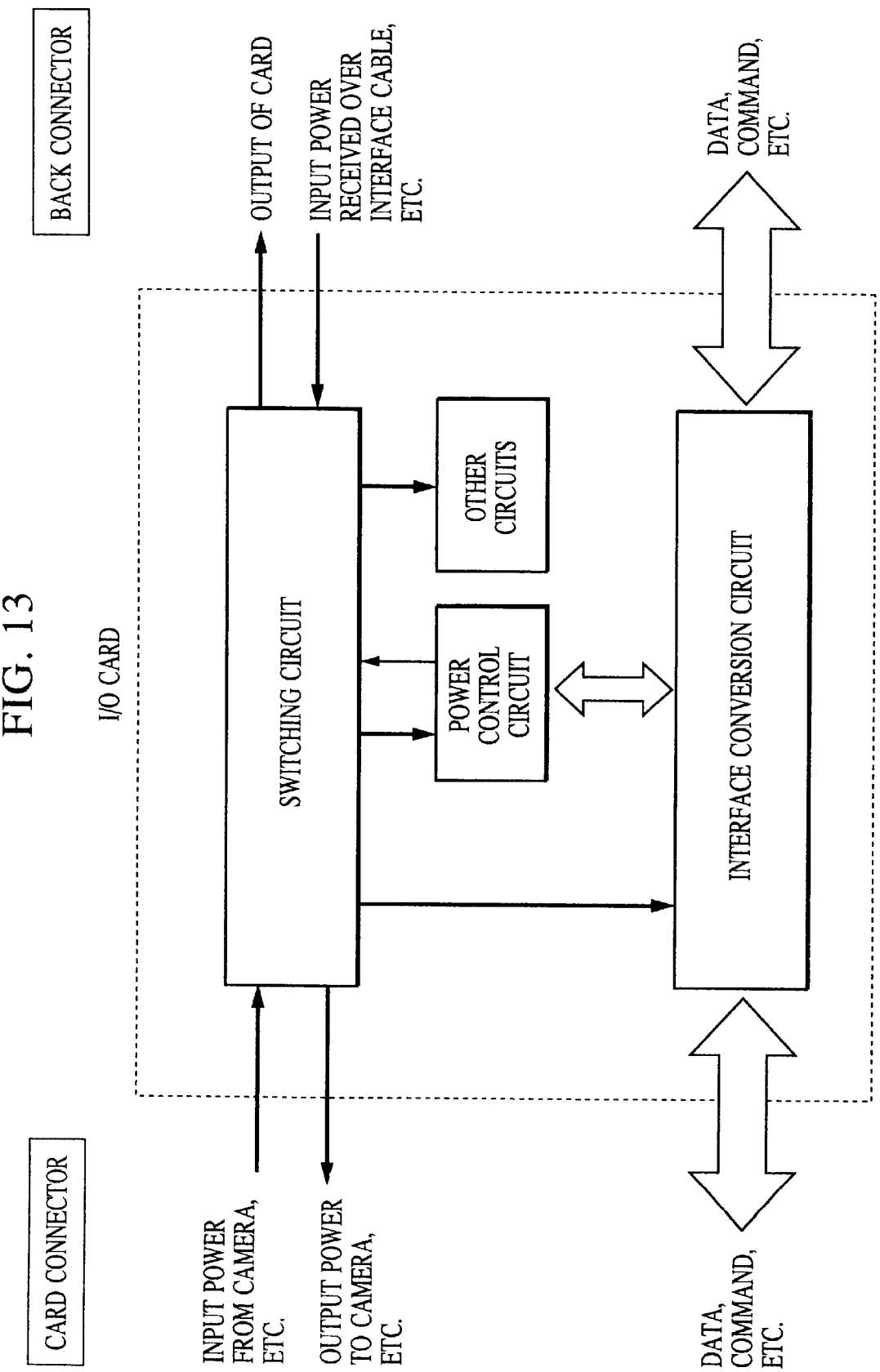
FIG. 13 is a functional block diagram of an I/O card.

Functional blocks of the I/O card 2 are shown in FIGS. 12 and 13 respectively. FIG. 12 is concerned with a card having no power control facility, and FIG. 13 is concerned with a card having the power control facility.

(Third Embodiment)

Figure 3:
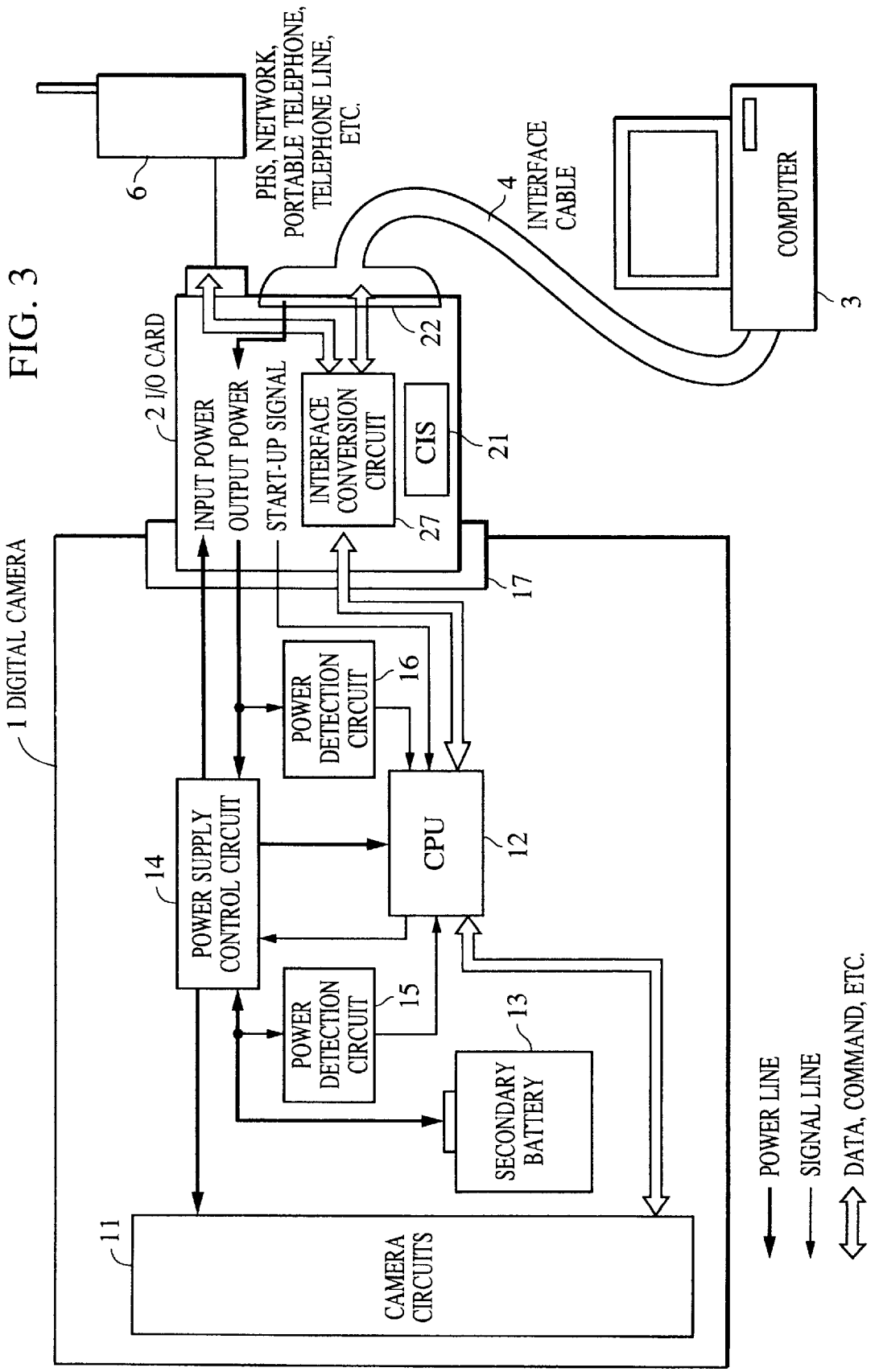
FIG. 3 is a functional block diagram of the third embodiment of the present invention.

FIG. 3 is a functional block diagram showing a digital camera system of the third embodiment of the present invention, wherein the same reference numerals are assigned to components identical to those shown in FIG. 1.

In FIG. 3, the I/O card 2 is an I/O card having an interface terminal 24 for interfacing a communication facility or a communication apparatus such as a Personal Handy Phone Standard (PHS) telephone, network, portable telephone, or telephone line in addition to an interface for interfacing the computer 3. Owing to the inclusion of the interface terminal, remote control of a camera or data communication can be achieved at a computer other than a handy computer (microcomputer) a user uses mainly, for example, another computer connected over a network, or a PHS telephone, portable telephone, or wire telephone.

(Fourth Embodiment)

Figure 4:
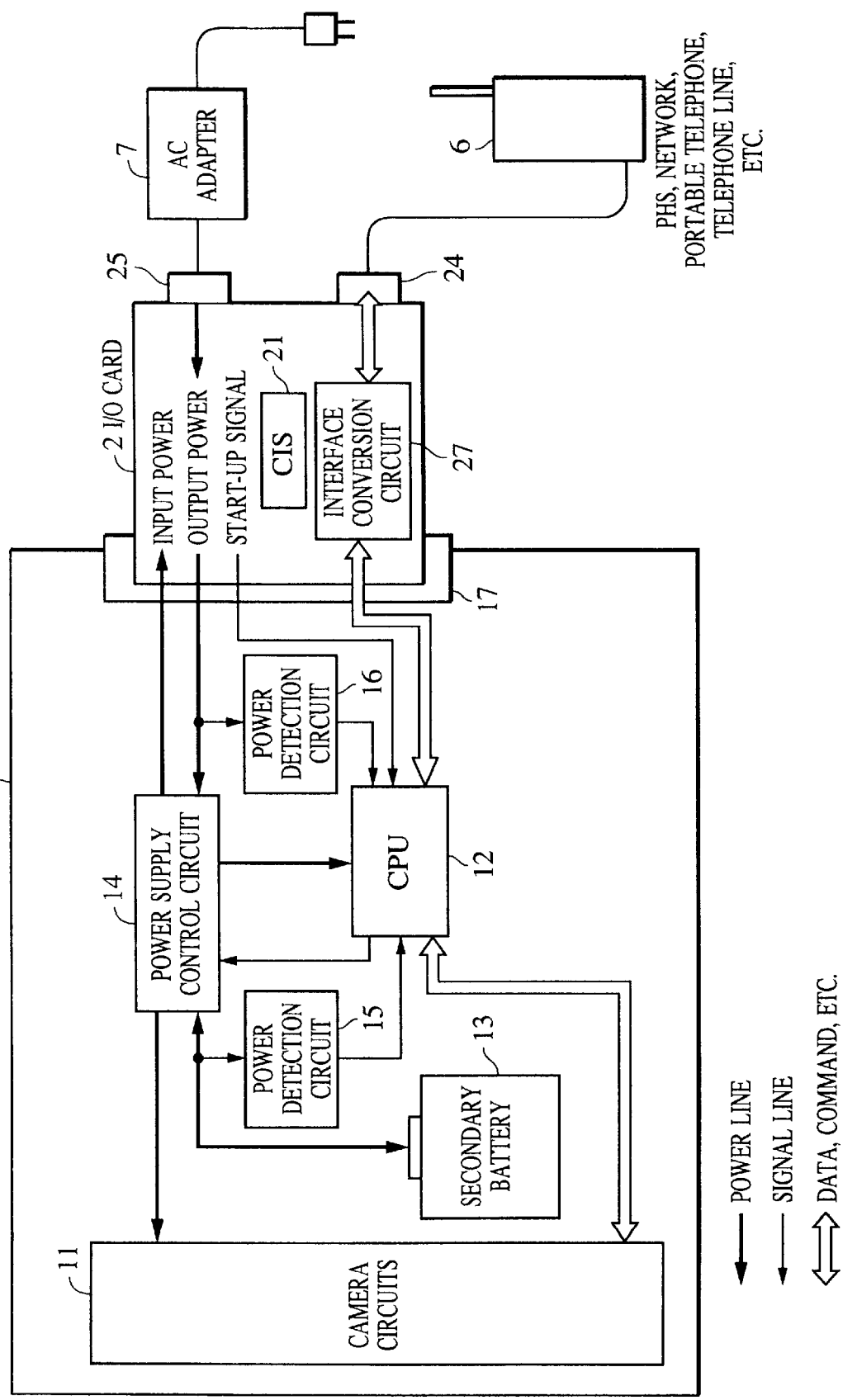
FIG. 4 is a functional block diagram of the fourth embodiment of the present invention.

FIG. 4 is a functional block diagram showing a digital camera system of the fourth embodiment, wherein the same reference numerals are assigned to components identical to those in FIG. 3.

In FIG. 4, the I/O card 2 has the interface terminal 24 for interfacing the communication facility 6 or a communication apparatus such as a PHS telephone, network, portable telephone, or telephone line, and a terminal 25 to be joined with an AC adaptor 7 (that is, a direct current (DC) power input terminal). Owing to the inclusion of the terminal 25, remote control of the digital camera 1 or data transfer to or from the digital camera 1 can be achieved directly at a communication apparatus such as a PHS telephone or portable telephone.

(Fifth Embodiment)

Figure 5:
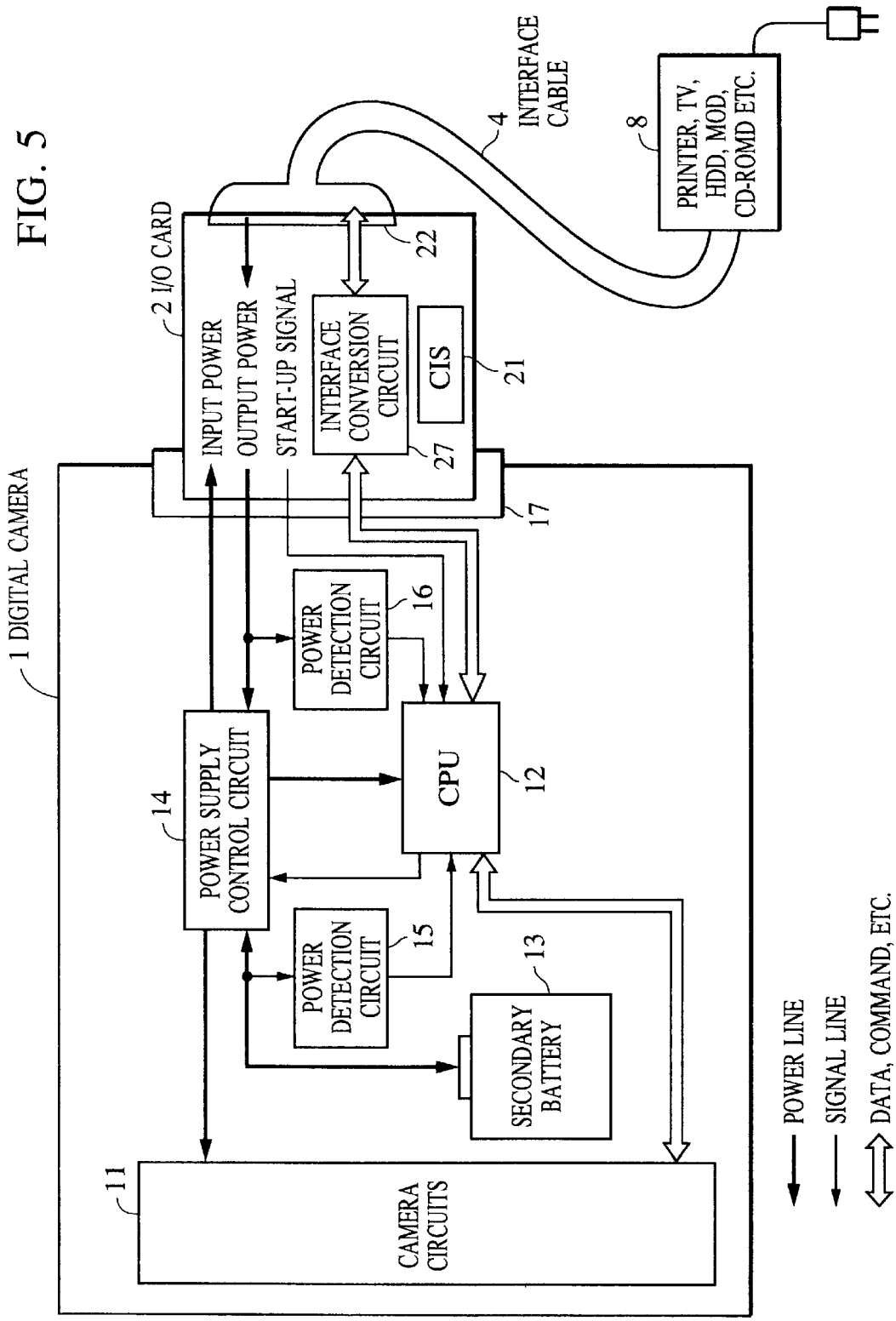
FIG. 5 is a functional block diagram of the fifth embodiment of the present invention.

FIG. 5 is a functional block diagram showing a digital camera system of the fifth embodiment, wherein the same reference numerals are assigned to components identical to those shown in FIG. 1.

In FIG. 5, equipment 8 including a printer, TV monitor, hard disk drive (HDD), magneto-optical disk drive (MOD), and CD-ROM drive each have an interface having a power supply ability, for example, an interface conformable to the USB or IEEE 1394 standard. Power is supplied from the equipment to the digital camera 1 via the I/O card 2. This makes it possible to achieve direct printing by performing a simple operation. Moreover, direct data recording of recording data on the HDD or MOD can be achieved readily. Besides, automatic data transfer to a printer or automatic printing can be achieved simultaneously with insertion of the card.

Moreover, the printer can be started up. When a memory card connectable to the I/O card 2 like the one in the second embodiment is employed, such a mechanism can be constructed that: only image data that should be printed can be recorded in the memory card; and once the memory card is linked to the I/O card, the image data in the memory card is transmitted automatically to the printer, and then printed immediately.

As mentioned above, since the card connector has the power supply terminal and start-up signal terminal, the scope of possible uses of the digital camera 1 has expanded.

(Sixth Embodiment)

Figure 6:
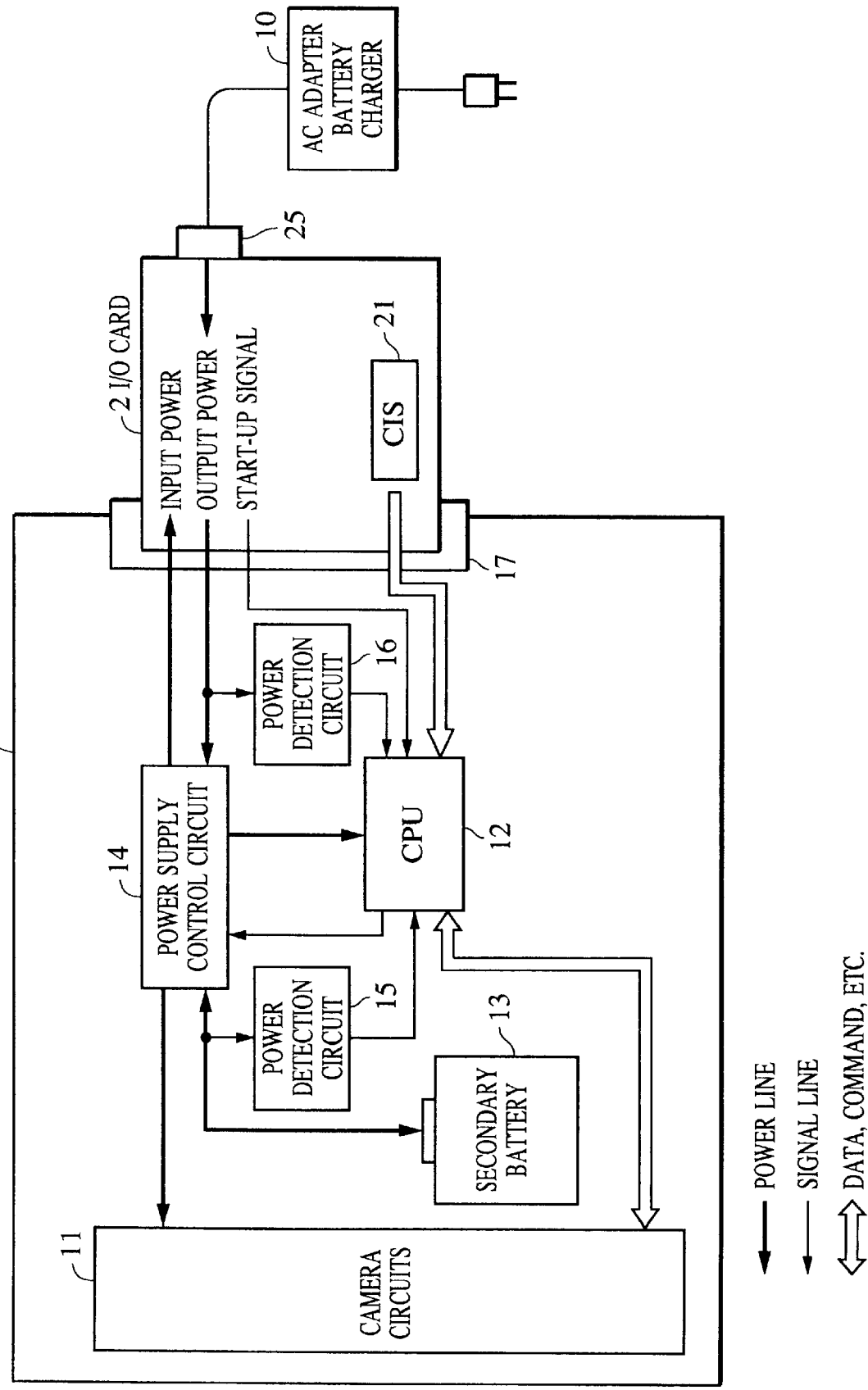
FIG. 6 is a functional block diagram of the sixth embodiment of the present invention.

FIG. 6 is a functional block diagram showing a digital camera system of the sixth embodiment, wherein the same reference numerals are assigned to components identical to those shown in FIG. 4.

The I/O card 2 shown in FIG. 6 is a card used to connect an AC adaptor or battery charger 10 to the digital camera 1 by way of the card slot, or a battery card with a built-in battery. The I/O card 2 has a power supply terminal and start-up signal terminal.

In this embodiment, the role of the power detection circuit 16 is a noteworthy feature. When the I/O card 2 is inserted, the CIS 21 stored in the card is checked to see if the I/O card (battery card) has been inserted.

A specified current is then supplied in order to check variations in voltage, whereby low-battery sensing is achieved. Incidentally, the discharge characteristic varies with the kind of battery. When the kind of battery being used is known, more accurate low-battery sensing can be achieved. Information concerning the kind of a battery is therefore included in the CIS 21 stored in the I/O card 2. Thus, sensing can be carried out according to the kind of battery used.

As mentioned above, power can be received via the I/O card.

Another important feature is that when CIS is checked to sense whether the I/O card has been inserted, the power supply control circuit 14 in the digital camera 1 turns off the charging circuit system for charging the secondary battery 13 in the digital camera 1. This prevents the battery in the I/O card from being used exclusively to charge the secondary battery in the digital camera 1.

(Seventh Embodiment)

Figure 7:
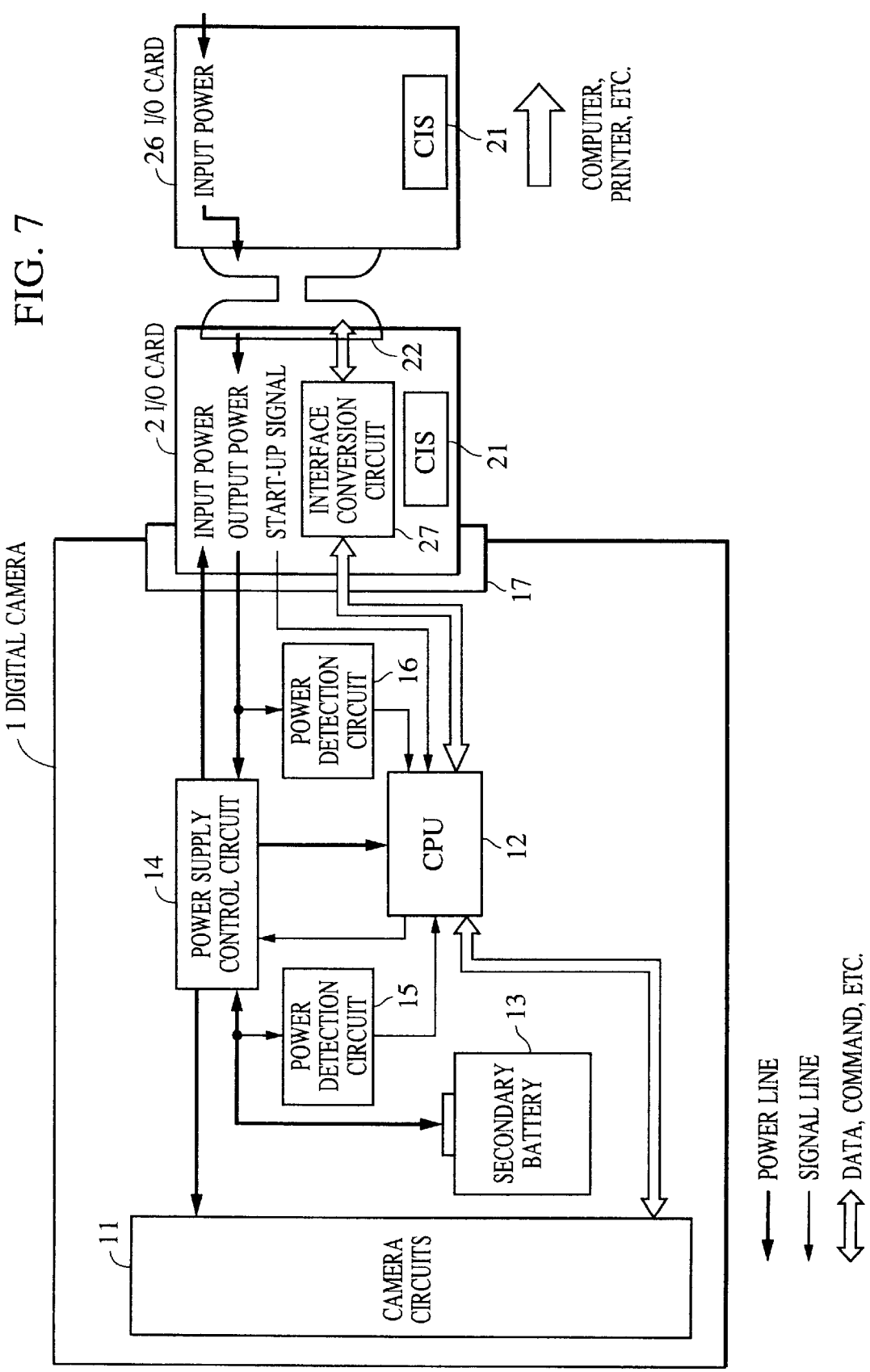
FIG. 7 is a functional block diagram of the seventh embodiment of the present invention.

FIG. 7 is a functional block diagram showing a digital camera system of the seventh embodiment, wherein the same reference numerals are assigned to components identical to those shown in FIG. 1.

An interface conformable to the USB or IEEE 1394 standard and having a power supply line is linked to a relevant equipment such as a computer, printer, TV, HDD, MOD, or CD-ROM drive via an I/O card 26.

The I/O card 26 has, like the I/O card connected to the digital camera 1, a power supply terminal through which power is received via the I/O card 2 and a start-up signal terminal.

Since the I/O card 26 shares the same interfacing specification with the I/O card 2, the I/O card 26 does not require the interface conversion circuit. In this case, a buffer alone suffices for input and output of data.

As mentioned above, since the card interface has the power supply terminal and start-up signal terminal, connection of an input apparatus such as a digital camera to a computer or peripheral equipment can be achieved readily. Moreover, power management within the whole system can be achieved. Besides, remote control of the input apparatus such as the digital camera or data transfer from the input apparatus can be achieved. Thus, the variation of usages of the digital camera or the like can be expanded greatly.

In the aforesaid embodiments, the card interface has both the power supply terminal and start-up signal terminal. Alternatively, the card interface may have only the power supply terminal. The aforesaid embodiments can still be configured.

Moreover, the above description has proceeded on the assumption that the digital camera is connected to the computer. Likewise, other peripheral equipment of a computer, such as a printer, can be readily connected to the computer or controlled remotely at the computer in the same ways as disclosed with reference to a camera.

As described above, according to this embodiment, since the card interface has the power supply terminal and start-up signal terminal, connection between the camera and computer or connection between the camera and peripheral equipment can be achieved readily.

Moreover, power management can be achieved. Remote control of a heavy-duty camera or data transfer to or from the camera can be achieved. Thus, the scope of possible uses of the digital camera can be expanded greatly. Eventually, the digital camera can be employed in a heavy-duty multimedia system easily.

What is claimed is:

1. An I/O card including one or more circuits, comprising:
   a first connecting means for linkage to a first apparatus;
   a second connecting means for linkage to a second apparatus; and
   a supply means for supplying power to the one or more circuits of said I/O card, the power being supplied either from the first apparatus via said first connecting means or from the second apparatus via said second connecting means.

2. An I/O card according to claim 1, wherein said second connecting means is a PC card interface connector.

3. An I/O card according to claim 1, wherein said first connecting means is a connector to which an interface cable is joined.

4. An I/O card according to claim 2, wherein said PC card interface connector includes a terminal used to supply a signal that instructs wake-up of a piece of electronic equipment.

5. An I/O card according to claim 1, further comprising a third connecting means being connected to a third apparatus.

6. An I/O card according to claim 5, wherein the third connecting means is connected to the third apparatus by one of a PC card, an AC adaptor, and a communication cable.

7. An electronic apparatus, comprising:
   a battery;
   a connecting means for connecting an I/O card, said connecting means including a power supply line and a wake-up signal line;
   a first power receiving means for receiving power supplied over the power supply line included in said connecting means;
   a second power receiving means for receiving power supplied from said battery;
   a selecting means for selecting one of said first power receiving means and said second power receiving means; and
   a signal receiving means for receiving a wake-up signal supplied over the wake-up signal line included in said connecting means.

8. An electronic apparatus according to claim 7, further comprising a control means for comparing information transmitted via said connecting means with power information concerning power supplied to said second power receiving means, and thus controlling said selecting means.

9. An electronic apparatus according to claim 8, further comprising a monitoring means for monitoring a power supply state of whichever of said first power receiving means or said second power receiving means has been selected by said selecting means, wherein the selected power receiving means is changed on the basis of the result of monitoring performed by said monitoring means.

10. An electronic apparatus according to claim 7, further comprising a charging means for charging said battery using power supplied over said power supply line included in said connecting means.

11. An electronic apparatus according to claim 7, wherein said electronic apparatus is any one of an imaging apparatus, digital camera, printer, image display apparatus, computer system, and communication apparatus.

12. An electronic apparatus according to claim 7, wherein said electronic apparatus is a memory unit.

13. An electronic apparatus according to claim 12, further comprising a sensing means for sensing the storage capacity of said memory unit after said electronic apparatus is started up, and a data transfer means for transferring data according to the result of sensing performed by said sensing means.

14. An electronic apparatus according to claim 7, wherein said power supply line is a terminal of a PC card interface connector.

15. An electronic system comprising:
   a first apparatus;
   a second apparatus;
   an I/O card including one or more circuits, the I/O card further including:
      a first connecting means for linkage to the first apparatus,
      a second connecting means for linkage to the second apparatus, and
      a supply means for supplying power to the one or more circuits of said I/O card, the power being supplied either from the first apparatus via the first connecting means or from the second apparatus via the second connecting means; and
   the second apparatus including:
      a battery,
      an I/O card connecting means for connecting said I/O card to said second apparatus, said I/O card connecting means including a power supply line and a wake-up signal line,
      a first power receiving means for receiving power supplied over the power supply line included in the I/O card connecting means,
      a second power receiving means for receiving power supplied from the battery,
      a selecting means for selecting one of the first power receiving means and the second power receiving means, and
      a signal receiving means for receiving a wake-up signal supplied over the wake-up signal line included in the I/O card connecting means.

16. An electronic system according to claim 15, wherein the second connecting means is a PC card interface connector.

17. An electronic system according to claim 16, wherein the PC card interface connector includes a terminal used to supply the signal used to wake-up said second apparatus.

18. An electronic system according to claim 15, wherein the first connecting means is a connector to which an interface cable is joined.

19. An electronic system according to claim 15, further comprising a third apparatus, wherein said I/O card further includes a third connecting means for linkage to the third apparatus.

20. An electronic system according to claim 19, wherein the third connecting means is connected to the third apparatus by one of a PC card, an AC adaptor, and a communication cable.

21. An electronic system according to claim 15, wherein said second apparatus further comprises a control means for comparing information transmitted via the I/O card connecting means with power information concerning power supplied to the second power receiving means, and thus controlling the selecting means.

22. An electronic system according to claim 21, wherein said second apparatus further comprises a monitoring means for monitoring a power supply state of whichever of the first power receiving means or the second power receiving means has been selected by the selecting means, wherein the selected power receiving means is changed on the basis of the result of monitoring performed by the monitoring means.

23. An electronic system according to claim 15, wherein said second apparatus further comprises a charging means for charging the battery using power supplied over the power supply line included in the I/O card connecting means.

24. An electronic system according to claim 15, wherein said second apparatus is any one of an imaging apparatus, digital camera, printer, image display apparatus, computer system, and communication apparatus.

25. An electronic system according to claim 15, wherein said second apparatus is a memory unit.

26. An electronic system according to claim 25, wherein said second apparatus further comprises a sensing means for sensing the storage capacity of the memory unit after said second apparatus is started up, and a data transfer means for transferring data according to the result of sensing performed by the sensing means.

27. An electronic system according to claim 15, wherein the power supply line is a terminal of a PC card interface connector.

* * * * *

UNITED STATES PATENT AND TRADEMARK OFFICE
CERTIFICATE OF CORRECTION

PATENT NO. : 6,151,652
DATED : November 21, 2000
INVENTOR(S) : Kenichi Kondo, et al.

It is certified that error appears in the above-identified patent and that said Letters Patent is hereby corrected as shown below:

Title page,
Item [56], Foreign Patent Documents,
"08095687" should read -- 8-095687 --.
"08167227" should read -- 8-167227 --.
"08167228" should read -- 8-167228 --.

Drawings, Sheet No. 9,
Figure 9, "comtrol" should read -- control --.

Signed and Sealed this

Sixteenth Day of October, 2001

Attest:

NICHOLAS P. GODICI
Attesting Officer
Acting Director of the United States Patent and Trademark Office